United States Patent [19]
Balasubramanian et al.

[11] Patent Number: 5,532,641
[45] Date of Patent: Jul. 2, 1996

[54] ASK DEMODULATOR IMPLEMENTED WITH DIGITAL BANDPASS FILTER

[75] Inventors: Peruvemba S. Balasubramanian, Chappaqua; Nathan J. Lee, New City; Scott D. Lekuch, New York, all of N.Y.

[73] Assignee: International Business Machines Corporation, Armonk, N.Y.

[21] Appl. No.: 323,331

[22] Filed: Oct. 14, 1994

[51] Int. Cl.[6] .................................................. H04L 27/06
[52] U.S. Cl. ........................ 329/311; 329/361; 375/320; 375/343
[58] Field of Search ...................... 329/311, 358, 329/361, 347; 455/337; 375/320, 340, 343

[56] References Cited

U.S. PATENT DOCUMENTS

| | | | |
|---|---|---|---|
| 4,065,722 | 12/1977 | Francis | 329/300 |
| 4,947,407 | 8/1990 | Silvian | 329/347 |
| 5,319,191 | 6/1994 | Crimmins | 250/214 R |

*Primary Examiner*—Siegfried H. Grimm
*Attorney, Agent, or Firm*—Perman & Green

[57] ABSTRACT

Amplitude Shift Keying (ASK) modulation system and method with an ASK demodulator that is implemented with an analog-emulating digital bandpass filter. The bandpass filter also generates a carrier detect signal when it detects a carrier frequency that passes the filter pass band.

20 Claims, 3 Drawing Sheets

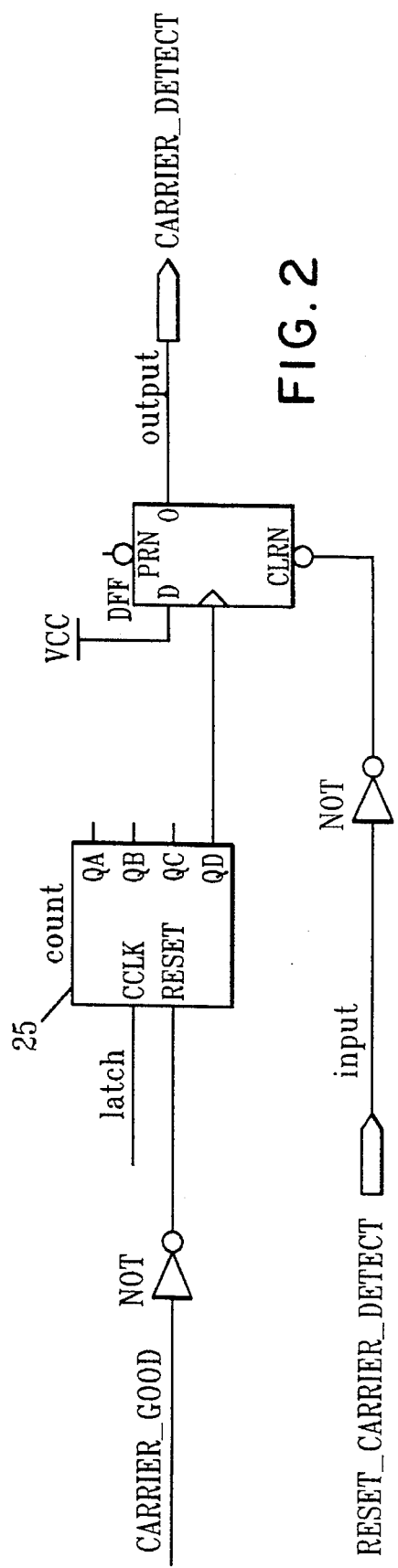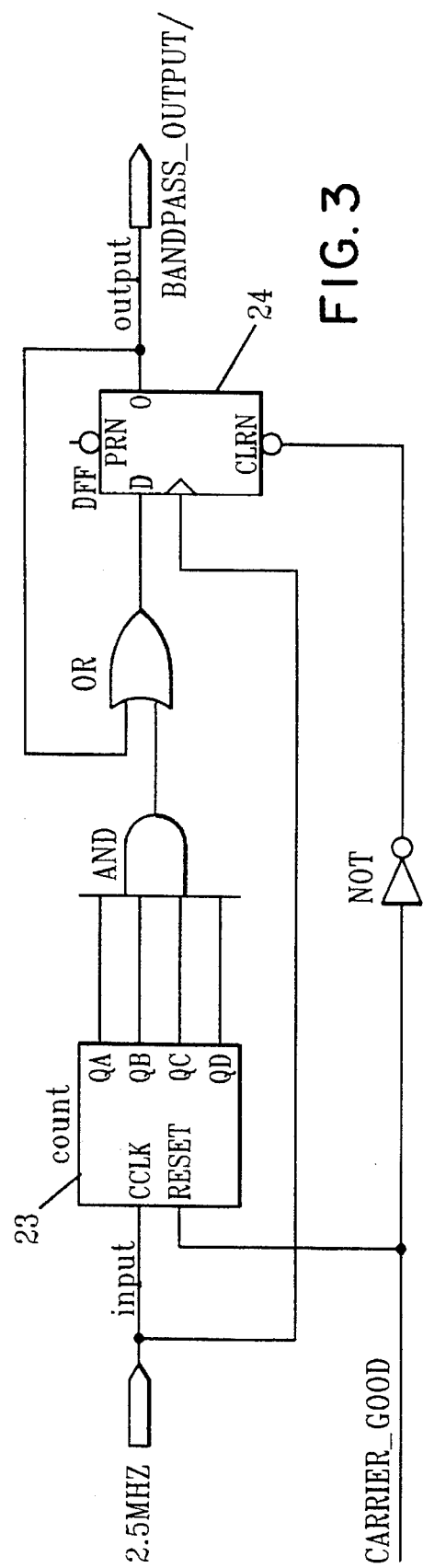

ASK DEMODULATOR IMPLEMENTED WITH DIGITAL BANDPASS FILTER

CROSS-REFERENCE

The present application and invention are related in subject matter to that of U.S. patent application Ser. No. 08/323,282 filed concurrently herewith and having the same inventorship and assigned to the same assignee as this application.

BACKGROUND OF THE INVENTION

1. Field of the Invention

The present invention relates to modulated electronic communications and more particularly to a system and method using Amplitude Shift Keying (ASK) modulation for such communications with an analog-emulating digital bandpass filter for demodulation and having application to infrared communication links.

2. Problem to be Solved

Amplitude Shift Keying (ASK) Modulation is one of the commonly used modulation methods for electronic communication. In communication systems using ASK encoding, demodulation is typically performed using an analog circuit while the controller which decodes the serial communication is designed using digital logic. The requirement for both analog and digital circuits tends to raise the cost of such communication systems. Furthermore, the analog bandpass filter used in the analog circuit usually requires many components, especially if it is to have a programmable cutoff frequency. In contrast, a digital bandpass filter lacks accuracy and still requires some minimal analog circuit to amplify the incoming signal. Although both types of filters have drawbacks, a system that requires various demodulators or different bandpass filters for multi-channel communication, will usually find a digital bandpass filter to be advantageous over an analog bandpass filter.

3. Objects

It is therefore an object of the present invention to provide an analog-emulating digital bandpass filter for use in demodulating ASK encoded signals.

It is another object of the present invention to provide an ASK MODEM including an improved digital bandpass filter for use in demodulating ASK modulated signals.

It is a further object of the present invention to provide an ASK MODEM including an improved digital bandpass filter for use in demodulating ASK modulated signals used in infrared (IR) communications.

SUMMARY OF THE INVENTION

The present invention involves an ASK MODEM with a demodulator that is implemented with a digital bandpass filter which is an analog-emulating filter that also generates a carrier detect signal when it detects a carrier frequency that is within the pass band.

The ASK demodulator takes an ASK modulated incoming signal, that is amplified by an analog circuit, and runs it through a Schmitt triggered input buffer to recondition the signal as well as to digitize it. The analog circuit just amplifies the input signals, and is AC coupled and DC offset so that it has a minimum at zero volts and a maximum at the supply voltage of the digital logic. The reconditioned signal is fed to the digital bandpass filter after synchronization with the system clock.

The analog-emulating digital bandpass filter consists of a carrier frequency qualifier, carrier detect logic, and a delay block that emulates the discharge characteristics of a capacitor in an analog band pass filter implementation.

The carrier frequency qualifier has a window that accepts a range of frequencies. The time between the receipt of the leading edge of one pulse to the leading edge of the next pulse is measured with a very high frequency clock. If this time is within the acceptable tolerance or within the desired band frequency, the carrier frequency qualifier activates a CARRIER_GOOD signal which follows the pattern of the ASK signal. Since this is done in the digital logic the width of the band as well as the cut off frequency are readily programmable. The carrier detect logic then counts the number of consecutive incoming pulses while the CARRIER_GOOD signal is active. If this logic counts a predefined number of pulses, it activates an ASK carrier detect circuit, which outputs a CARRIER_DETECT signal. This number may also be programmed so that the accuracy of the carrier detect logic may be adjusted depending on the application. At the same time, the delay block logic prolongs the CARRIER-GOOD signal for a predefined amount of time, which also can be designed to be programmable. The BANDPASS-OUTPUT signal output of this delay block logic is the output of the bandpass filter and the logic emulates the discharge period of an analog filter.

The modulator portion of the MODEM consists of a carrier frequency generator and adder circuit. The system clock is divided down to generate a clock with the desired frequency and an almost 50 percent duty cycle. In some applications it may be desirable to make both the frequency and duty cycle programmable. The output of the carrier frequency generator is ANDed with inverted raw transmit data to create the required ASK transmit signal.

By using the digital bandpass filter in the ASK MODEM, a less expensive and yet effective demodulator is provided, which, for example, may facilitate infrared (IR) communications.

BRIEF DESCRIPTION OF THE DRAWINGS

FIG. 2 is a schematic diagram illustrating an ASK MODEM carrier detect circuit in accordance with the invention.

FIG. 3 is a schematic diagram illustrating an analog filter emulation in the ASK MODEM of the invention.

DETAILED DESCRIPTION OF THE INVENTION

An ASK MODEM in accordance with the present invention may be implemented as part of a custom ASIC designed to support multiple IR modulation formats and protocols. The ASIC may include a standard 16550 UART (obtainable from VLSI Technology, Inc., Burlington, Mass.) which is used to produce and receive serial data in an asynchronous format. The present ASK modulator and demodulator are designed to be compatible with other ASK systems using a 500 kHz carrier.

Figure 4:
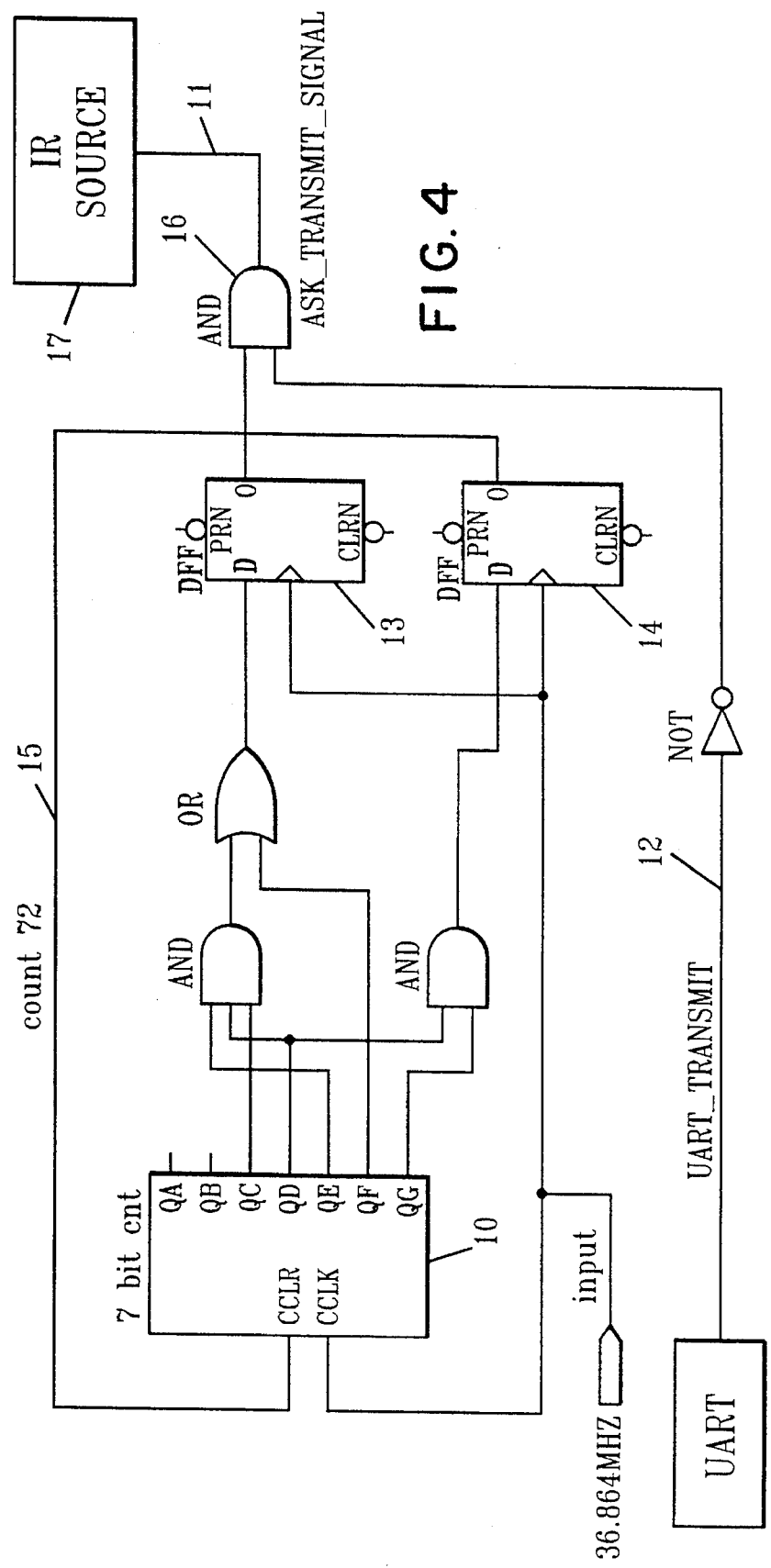
FIG. 4 is a schematic diagram illustrating a transmit carrier modulation circuit in the ASK MODEM of the invention.

Referring first to FIG. 4, a modulator circuit for producing an ASK transmit signal in accordance with the invention is shown with a carrier frequency generator and adder circuit wherein a seven bit counter 10 may be used to divide the input of about 36.864 MHz master clock source counts by 74, with 36 of those counts producing a high output signal, in order to generate a square wave output of about 498.16 kHz from latch 13. A latch 14 is set on the clock edge after the seven bit counter 10 reaches the count of 72. The output of the latch 14 is fed back on line 15 to reset the counter 10 so that the counter cycle always consists of 74 clock counts. The value of the counter 10 output is sampled by latch 13, the output of which goes HIGH if the count value is in the range from 28 to 63. The output of latch 13 is a square wave of 498.16 kHz and is used to modulate the signal from the transmit line 12 of a standard UART by logically gating it through AND gate 16.

Figure 5:
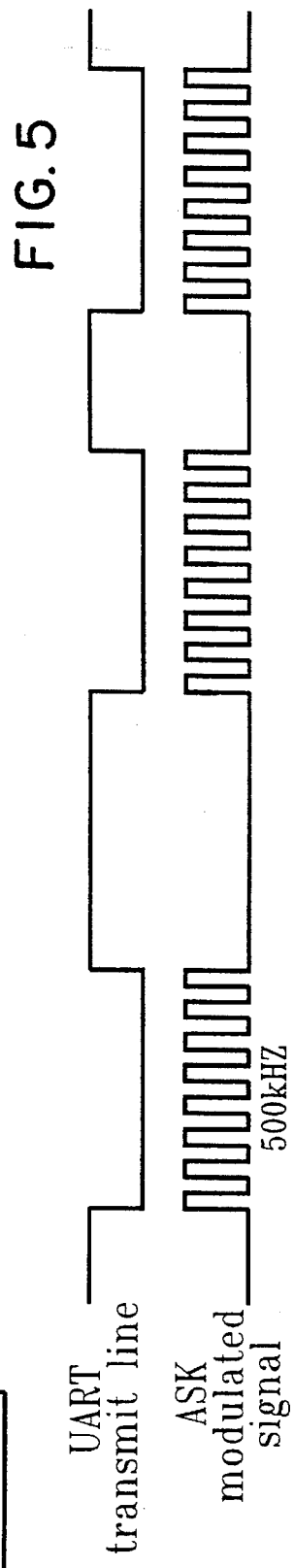
FIG. 5 is a diagram illustrating the form of input signal and of the modulated signal produced by the ASK MODEM of the invention.

Accordingly, a square wave is generated on line 11 whenever the UART output transmit signal on line 12 is LOW. The forms of the transmit signal and square wave are shown in FIG. 5. Thus, an approximately 500 kHz carrier signal is produced during the start bit of each character in the input signal and during each zero bit period. The 500 kHz output signal is then fed on line 11 to a suitable output device, such as an IR source 17, in order to produce the desired ASK modulated IR light signal. The clock to the seven bit counter 10 is disabled whenever the UART transmit line 12 is HIGH in order to conserve power. The system clock is divided down to generate a clock with the desired frequency and an almost 50 percent duty cycle. In some applications it may be desirable to make both the frequency and duty cycle programmable. The output of the carrier frequency generator is ANDed with inverted raw transmit data to create the required ASK modulated transmit signal.

Figure 1:
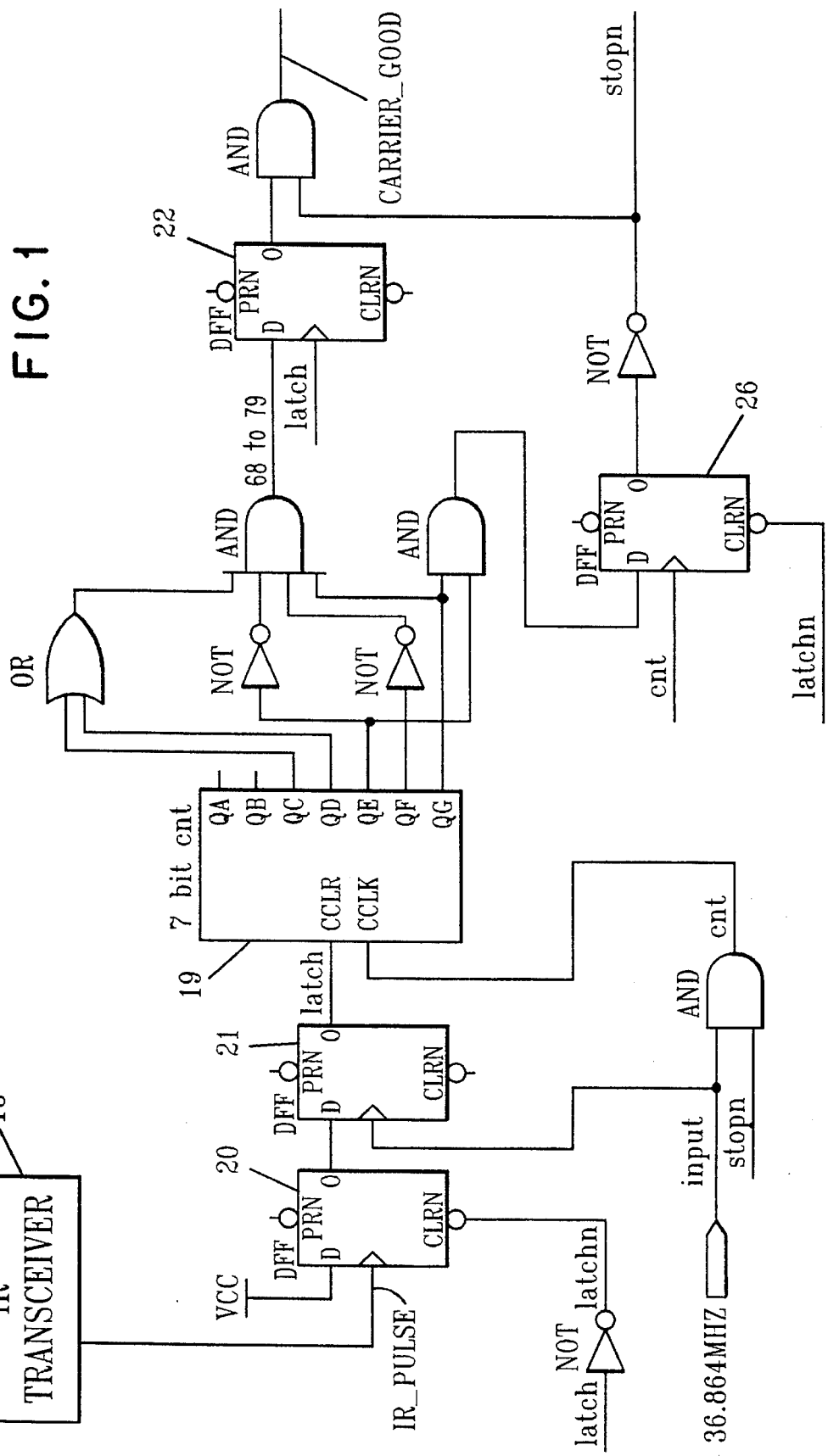
FIG. 1 is a schematic diagram illustrating an ASK MODEM digital bandpass filter in accordance with the present invention.

On the receiver side, as seen in FIG. 1, the ASK MODEM of the invention, has a demodulator comprising an IR transceiver 18, acting as a receiver, and an analog-emulating digital bandpass filter. The IR receiver 18 amplifies the incoming signal with an analog circuit and takes the amplified incoming signal and runs it through a Schmitt-triggered input buffer to recondition the signal as well as to digitize it. The analog circuit just amplifies the input signals and is AC coupled and DC offset so that it has a minimum at zero volts and a maximum at the supply voltage of the digital logic. The reconditioned signal is fed to the digital bandpass filter after synchronization with the system clock.

The bandpass filter is variously shown in FIGS. 1–3 and consists of a carrier frequency qualifier (FIG. 1), carrier detect logic (FIG. 2), and a delay block (FIG. 3) that emulates the discharge characteristics of an analog band pass filter implementation. Briefly the filter operates as follows. The carrier frequency qualifier of FIG. 1 has a window that accepts a range of pulse frequencies. The time between the receipt of the leading edge of one pulse to the leading edge of the next pulse is measured with a very high frequency clock. If this time is within the acceptable tolerance or within the desired band frequency, the carrier frequency qualifier activates a CARRIER_GOOD signal. Since this is done in the digital logic, the width of the band and the cut off frequency may readily be made programmable. The carrier detect logic then counts the number of consecutive incoming pulses while CARRIER_GOOD is active. If it counts a predefined number of pulses, it activates an ASK carrier detect circuit, shown in FIG. 2, which outputs a CARRIER_DETECT signal. This predefined number may also be programmed so that the accuracy of the carrier detect logic may be adjusted depending on the application. At the same time, the delay block logic of FIG. 3 prolongs the CARRIER_GOOD signal for a predefined amount of time, which also can be designed to be programmable. The output of this delay logic is the output of the bandpass filter.

More particularly, referring to FIG. 1, the digital bandpass filter for emulating an ASK analog bandpass filter, and centered around a carrier frequency of 500 kHz, consists of a seven bit counter 19 which is clocked by a master 36.864 MHz clock. Counter 19 is reset on each edge of an incoming IR pulse, from IR transceiver 18, which is detected by latches 20 and 21. The current count value is compared each time the counter 19 is reset and a latch 22 is set if the count value is in the range of 68 to 79. The output of latch 22 is gated by an AND gate with the inverted output of latch 26 which becomes set when counter 19 reaches the count of 80. The CARRIER_GOOD signal is therefore shut off if no subsequent IR pulse is received within 80 clock pulse cycles of the previous IR pulse.

By setting latch 22 in the 68 to 79 count range, latch 22 is therefore set when the period between two incoming IR pulses corresponds to a frequency of anywhere from 467 kHz to 542 kHz and its ANDed output produces the CARRIER_GOOD signal. Since such signal sensing is an overly strict bandpass indicator, an additional stage (FIG. 3) may be added to allow the CARRIER_GOOD output of the filter to stay set for up to three carrier pulse periods after latch 22 becomes set, regardless of the incoming IR signal. This additional stage functions to simulate the time constant of discharging which occurs in an analog bandpass circuit.

Specifically, as seen in FIG. 3, a four bit counter 23 is reset, in response to the CARRIER_GOOD signal output which results whenever a valid IR signal is detected by the band pass filter of FIG. 1. The valid CARRIER_GOOD IR signal is then prolonged by a latch 24 which is only reset when the output of the counter 23 reaches a count of 15. Latch 24 accordingly controls the output of the digital band pass filter, which output is then fed to a UART for implementing. Thus this additional stage simulates the time constant of discharging of an analog band pass filter.

An additional circuit shown in FIG. 2 is included which sets a flag, the CARRIER_DETECT SIGNAL, when a minimum of eight consecutive IR pulses satisfy the frequency range requirement. This circuit uses a four bit counter 25 to count the number of valid IR pulses of the CARRIER_GOOD signal. The CARRIER_DETECT SIGNAL flag is used to provide an indication to the controlling software that a valid ASK modulated signal is being received.

By using the digital bandpass filter in the ASK MODEM, a less expensive and yet effective demodulator is provided which may be used for handling and facilitating infrared (IR) communications.

The ASK MODEM described herein is particularly suitable for use in the Interoperable Multiprotocol Directed Infrared Wireless Communication Controller disclosed in our U.S. patent application Ser. No. 08/323,282 filed concurrently herewith and incorporated by reference. This MODEM also can be used in any communication controller that uses ASK modulation. The programmable digital bandpass filter of the invention can be used in any application that requires a digital bandpass filter.

This MODEM has been found to be compatible, for example, with the Sharp WIZARD personal organizer unit which employs a 500 kHz analog IR transceiver. Additionally, the ASK modulation has been tested between two custom ASIC units up to data rates of 38.4 kbps.

While the invention has been particularly shown and described with respect to a preferred embodiment thereof, it will be understood by those skilled in the art that changes in form and details may be made therein without departing from the scope and spirit of the invention.

What is claimed is:

1. Apparatus for demodulating an ASK modulated signal, comprising:

means for reconditioning and digitizing an incoming ASK modulated signal and producing first output signal pulses in accordance therewith;

means for synchronizing said first output signal pulses with a system clock signal;

means for qualifying said first synchronized signal pulses and producing a CARRIER_GOOD (C_G) output signal in accordance therewith when the carrier frequency of said signal pulses is within a predefined bandpass frequency;

means for prolonging said C_G output signal for a predefined amount of time while said C_G output signal is active; and means for outputting said prolonged C_G signal pulses as said demodulated ASK signal.

2. The apparatus of claim 1 wherein said qualifying means comprises:

counter means for producing clocked count pulses;

means, responsive to each edge of said first synchronized signal pulses, for resetting said counter means upon detecting each edge of said first synchronized signal pulses;

means for sensing the number of said clocked count pulses each time said counter means is reset;

latch means, coupled to the output of said counter means, for outputting, when set, a second signal in accordance with the output of said counter means;

means for setting said latch means if said number of clocked count pulses is in the range of 68 to 79; and means, coupled to said latch means, for outputting said second signal as said C_G output signal.

3. The apparatus of claim 2 wherein said means for outputting said second signal as said G_C output signal comprises means for discontinuing said second signal if said number of clocked count pulses reaches 80.

4. The apparatus of claim 1 wherein said prolonging means comprises:

counter means, responsive to the receipt of said C_G output signal, for producing clocked count pulses; and latch means, responsive to said clocked count pulses, for passing said C_G output signal and extending its length in accordance with a predefined clock pulse count.

5. The apparatus of claim 4 wherein said prolonging means further comprises means for programming said predefined clock pulse count.

6. The apparatus of claim 1 further comprising:

means for counting the number of consecutive first output signal pulses while said (C_G) signal is active and producing a CARRIER_DETECT (C-D) signal when a predefined number of pulses is counted.

7. The apparatus of claim 6 wherein said means for counting the number of consecutive first output signal pulses comprises means for programming said predefined number of pulses to be counted.

8. The apparatus of claim 1 wherein said qualifying means comprises:

a very high frequency clock; and means for measuring the time between the receipt of the leading edge of one pulse to the leading edge of the next pulse of said first output signal pulses with said very high frequency clock.

9. The apparatus of claim 1 wherein said qualifying means comprises means for programming said predefined bandpass frequency.

10. The apparatus of claim 1, further comprising means for producing said ASK modulated signal, comprising:

a master clock source for producing about a 36.864 Mhz clock count; and counter means for dividing said 36.864 Mhz by 74 to generate a square wave output of about 498.16 kHz, said counter means comprising a counter for cyclically outputting 74 counts, and latch means, responsive to a count in the range from 68 to 79, for outputting said 498.16 kHz square wave.

11. A method for demodulating an ASK modulated signal, comprising the steps of:

reconditioning and digitizing an incoming ASK modulated signal and producing first output signal pulses in accordance therewith;

synchronizing said first output signal pulses with a system clock signal;

qualifying said first synchronized signal pulses and producing a CARRIER_GOOD (C_G) output signal in accordance therewith when the carrier frequency of said signal pulses is within a predefined bandpass frequency;

prolonging said C_G output signal for a predefined amount of time while said C_G output signal is active; and outputting said prolonged C_G signal pulses as said demodulated ASK signal.

12. The method of claim 11 wherein said qualifying step comprises:

producing clocked count pulses;

resetting the count of said clocked count pulses upon detecting each edge of said first synchronized signal pulses;

counting the number of said clocked count pulses each time said count is reset;

outputting a second signal when the count of said clocked count pulses corresponds to a frequency in the range from about 467 kHz to about 542 kHz; and outputting said second signal as said C_G output signal.

13. The method of claim 12 wherein said step of outputting said second signal as said G_C output signal comprises discontinuing said second signal if said number of clocked count pulses reaches 80.

14. The method of claim 11 wherein said prolonging step comprises:

producing, in response to the receipt of said C_G output signal, clocked count pulses; and in response to said clocked count pulses, passing said C_G output signal and extending its length in accordance with a predefined clocked pulse count.

15. The method of claim 14 wherein said prolonging step further comprises programing said predefined clock pulse count.

16. The method claim 11 further comprising the steps of:

counting the number of consecutive first output signal pulses while said (C_G) signal is active; and producing a CARRIER_DETECT (C-D) signal when a predefined number of pulses is counted.

17. The method of claim 16 wherein said step of counting the number of consecutive first output signal pulses comprises programming said predefined number of pulses to be counted.

18. The method claim 11 wherein said qualifying step comprises:

providing a very high frequency clock; and measuring the time between the receipt of the leading edge of one pulse to the leading edge of the next pulse of said first output signal pulses with said very high frequency clock.

19. The method of claim 11 wherein said qualifying step comprises programming said predefined bandpass frequency.

20. The method of claim 11, further comprising producing said ASK modulated signal by the steps comprising:

producing about a 36.864 Mhz clock count; and dividing said 36.864 Mhz by 74 to generate a square wave output of about 498.16 kHz, by cyclically outputting 74 counts and when said count is in the range from 68 to 79, outputting said 498.16 kHz square wave.

* * * * *